United States Patent
Ramakrishnan

(10) Patent No.: US 7,821,870 B2
(45) Date of Patent: Oct. 26, 2010

(54) METHOD AND SYSTEM FOR IDENTIFYING MOVING OBJECTS USING ACOUSTIC SIGNALS

(75) Inventor: Bhiksha Ramakrishnan, Watertown, MA (US)

(73) Assignee: Mitsubishi Electric Research Laboratories Inc., Cambridge, MA (US)

( * ) Notice: Subject to any disclaimer, the term of this patent is extended or adjusted under 35 U.S.C. 154(b) by 134 days.

(21) Appl. No.: 11/208,463

(22) Filed: Aug. 19, 2005

(65) Prior Publication Data

US 2007/0052578 A1    Mar. 8, 2007

(51) Int. Cl.
- G01S 15/04 (2006.01)
- G01S 13/04 (2006.01)
- G01S 15/00 (2006.01)
- G01S 13/00 (2006.01)

(52) U.S. Cl. .............. 367/93; 367/87; 367/94; 367/135; 367/136; 342/27; 342/28; 342/89; 342/90; 342/175; 342/192; 342/193; 342/195; 342/196

(58) Field of Classification Search .......... 382/103; 367/25, 37–67, 117, 118, 124, 125, 135, 367/136, 191, 87–116; 342/27, 28, 52, 89, 342/90, 159–164, 175, 189–197, 59

See application file for complete search history.

(56) References Cited

U.S. PATENT DOCUMENTS

| | | | | |
|---|---|---|---|---|
| 3,383,678 A | * | 5/1968 | Palmer | 342/28 |
| 3,665,443 A | * | 5/1972 | Galvin | 367/94 |
| 3,719,945 A | * | 3/1973 | Sletten et al. | 342/193 |
| 3,725,917 A | * | 4/1973 | Sletten et al. | 342/193 |
| 3,803,603 A | * | 4/1974 | Perot | 342/90 |
| 3,983,558 A | * | 9/1976 | Rittenbach | 342/193 |
| 4,025,919 A | * | 5/1977 | Jefferies et al. | 367/88 |
| 4,051,472 A | * | 9/1977 | Albanese et al. | 342/28 |
| 4,101,890 A | * | 7/1978 | Goyard | 342/193 |
| 4,348,674 A | * | 9/1982 | Muth et al. | 342/192 |
| 4,972,385 A | * | 11/1990 | Teel | 367/99 |
| 5,073,780 A | * | 12/1991 | Barley et al. | 342/192 |
| 5,337,053 A | * | 8/1994 | Dwyer | 342/90 |
| 5,376,940 A | * | 12/1994 | Abatzoglou | 342/192 |
| 5,790,032 A | * | 8/1998 | Schmidt | 342/28 |
| 5,949,367 A | | 9/1999 | Trompf et al. | |
| 6,653,971 B1 | * | 11/2003 | Guice et al. | 342/27 |
| 6,724,689 B2 | * | 4/2004 | Koenig | 367/125 |
| 6,801,155 B2 | * | 10/2004 | Jahangir et al. | 342/90 |
| 6,992,613 B2 | * | 1/2006 | Yoneda | 342/175 |

(Continued)

FOREIGN PATENT DOCUMENTS

DE    10027828    12/2001

OTHER PUBLICATIONS

Harrison et al.: "Classification of underwater targets with active sonar," May 25, 2003.

(Continued)

*Primary Examiner*—Bernarr E Gregory
(74) *Attorney, Agent, or Firm*—Dirk Brinkman; Gene Vinokur

(57) ABSTRACT

An acoustic tone at a predetermined frequency is detected after being reflected and modulated by an unknown moving object. Acoustic features are extracted from the reflected acoustic tone using acoustic spectral analysis. A dimensionality of the acoustic features is reduced, and the reduced dimensionality features are statistically classified to identify the object.

26 Claims, 2 Drawing Sheets

U.S. PATENT DOCUMENTS

2003/0164792 A1 9/2003 Jahangir et al.
2003/0169640 A1* 9/2003 Koenig ...................... 367/191

OTHER PUBLICATIONS

"Application of a continuous wave radar for human gait recognition", Michael Otero, Proc. of SPIE vol. 5809, pp. 538-548.

"A continuous-wave (CW) radar for gait analysis", Geisheimer, J.L., Marshall, W.S. and Greneker, E., Signals, Systems and Computers, 2001. Conference Record of the Thirty-Fifth Asilomar Conference on vol. 1, Nov. 4-7, 2001 pp. 834-838 vol. 1.

* cited by examiner

METHOD AND SYSTEM FOR IDENTIFYING MOVING OBJECTS USING ACOUSTIC SIGNALS

FIELD OF THE INVENTION

The present invention relates generally to identifying and classifying moving objects from features extracted from Doppler signals, and more particularly to continuous narrow band Doppler signals and general features.

BACKGROUND OF THE INVENTION

Surveillance and Monitoring

There are many applications where it is important to identify or classify people, animals, vehicles, etc. (generally, objects), that may be moving in an environment. It is also useful to detect unusual patterns of motion or behavior. Such applications include surveillance and monitoring. Surveillance includes monitoring environments for suspicious activity. Machine monitoring can anticipate failures by detecting abnormal activity. Other applications can be similarly identified.

The bulk of current technologies for such monitoring typically involve the use of high-resolution, but expensive sensors such as cameras and microphone arrays. These types of sensors can provide high-resolution information about the activities in the monitored environment.

Alternatively, low-resolution and inexpensive sensors, such as motion sensors and infrared sensors, can be used. Low-resolution sensors provide coarse information such as the presence of some motion activity in the monitored environment. However, low-resolution sensors are unable to provide any additional information by themselves that permit more detailed inferences.

Doppler Signals

Doppler radar and sonar systems have been used extensively to detect moving objects. Conventionally, Doppler systems emit a broadband signal, e.g., a wide range of frequencies, as short intermittent pulses. An energy and delay of reflected pulses are indicative of a velocity and size of moving objects.

The Doppler Effect

The Doppler Effect is achieved when an oscillatory signal is incident on an object. The reflected signal has a different frequency when the object is moving than when the object is static. The Doppler Effect is commonly used for detection and ranging in sonar and radar systems.

A corollary of the basic Doppler Effect is that when the oscillatory signal is concurrently incident on multiple objects, each object reflects a signal with a different frequency based on the velocity of the object. If the oscillatory signal is incident on a collection of moving objects, then the reflected signal includes a combination of all the frequencies due to the different motions of the objects.

The Doppler Effect and Articulated Objects

An articulated object is an object with one or more rigid links, e.g., arms and legs, connected by joints having constrained movement, e.g., elbows and knees. When articulated objects move, the different links exhibit different velocities with respect to the center of mass of the object. Thus, for example, while the object, as a whole, is moving forward at three meters per second with respect to a sensor, the links can appear to be moving at various forward and backward velocities. Typically, a maximum variation in velocity is observed at the extremities of the links. When the moving object is a walking person, the velocities vary in a generally predictable oscillatory manner.

When an oscillatory signal is incident on an articulated object, different parts of the object having different velocities will reflect different frequencies. Thus, the spectrum of the signal captured by a sensor exhibits an entire range of frequencies. Further, the spectrum varies continually over time as the velocities of the parts of the object change. This variation may be periodic or cyclic when the motion of the articulated object is periodic.

When a continuous tone, either acoustic or electromagnetic, is incident on the moving articulated object, the spectrum of the reflected signal shows patterns and periodicities that are characteristic of the motion of the target object.

Gait Analysis

We note finally that the human body may be modeled as an articulated object consisting of joints and stiff connections between them. A person's gait is the characteristic motion of their underlying articulated structure.

Because of the predictability of human gait, rule-based systems have been used to identify gaits. This makes sense. Hence, the Doppler shifted spectrum of a tone reflected from a moving person can be used to identify the person by their gait, M. Otero, "Application of a continuous wave radar for human gait recognition", Proc. of SPIE, vol. 5809, pp. 538-548, March 2005 and J. Geisheimer et al., "A continuous-wave (CW) radar for gait analysis", Conference Record of the Thirty-Fifth Asilomar Conference on Signals, Systems and Computers, vol. 1, pp. 834-838, 4-7 Nov. 2001.

In the prior art, the reflected Doppler signal from a target object is analyzed. Features that are specific to gait are extracted. Then, a rule-based classifier designed for gait features is used to identify the presence of a person, or to distinguish between a person and an animal according to their gait. Such systems generally give reliable results.

However, there are a number of problems with the prior art Doppler systems. First, the features that are extracted are features that are consistent with a specific motion, particularly oscillatory motion of an articulated animate object. Thus, effectively, the type of motion and the type of object is generally known. This makes it possible to use a rule-based system, which gives reliable classifications. However, a rule-based system for specific features is constrained to identify a specific object or a narrow class of objects, with a particular type of motion. Specifically, up to now, only animal and human oscillatory gaits can be identified with a continuous wave Doppler system.

SUMMARY OF THE INVENTION

One embodiment of the invention includes a Doppler system. The system includes a transmitter that emits a narrow band 'tone'. The tone can be in the form of an electromagnetic signal or an acoustic signal. The term 'tone' is used herein to distinguish the narrow band signal from conventional broadband radar signals.

The frequency of the tone can be adjusted to accommodate the environment. For example, in a natural environment, it might advantageous to use ultrasound to lessen the effect on people, and because most naturally-occurring frequencies are in the range of about 20 Hz to 20000 Hz. In contrast, high frequency acoustic signals may dominate in a machine room. In this case, a low frequency tone, e.g., 5-20 Hz, may make sense. The frequency can also be adjusted to achieve a desired resolution. That is, higher frequencies give higher resolutions.

The tone is reflected by one or more unknown objects that are in the path of the transmitted tone. The frequency of the transmitted tone is modulated when reflected and the object is moving, or when the unknown object includes moving parts. Therefore, the reflected signal can have a range of frequencies that can be different than the frequency of the transmitted signal.

A receiver senses and digitizes the reflected signal. The data of the reflected signal are analyzed to obtain a continuous sequence of measurements in the form of general features. The features are further processed by a statistical classifier to determine an identity of the unknown object and, further, a state or mode of operation of the unknown objects.

The classifier can be trained with training data acquired from known objects, or classes of objects in known states of operation. The classifiers can identify specific objects, including people, animals, vehicles, machines and their modes of operation. In addition, the classifier can detect anomalies in their motion, which perhaps, are indicative of a potential malfunction.

If training data are not available, then the system can still detect and identify a broad class of objects, such as people or solid moving objects using the statistical classifiers.

Multiple such Doppler systems transmitting tones with different frequencies can be used in conjunction to analyze more complex environments with multiple objects, or objects that are moving at angles to the primary direction of the transmitted signals.

The system and method can derive high-resolution information from a monitored environment Inferences can be made from the information. The various embodiments of the invention can generically detect and classify any type of object with articulated structure or non-linear motion. Hence, the invention can distinguish between people, or people and animals, or various types of inanimate objects, such as between a milling machine and a lathe.

The invention can also distinguish between the states of operation of objects, e.g., to identify a faulty operation. Both pulsed and continuous wave radar can be employed.

DETAILED DESCRIPTION OF PREFERRED EMBODIMENTS

Figure 1:
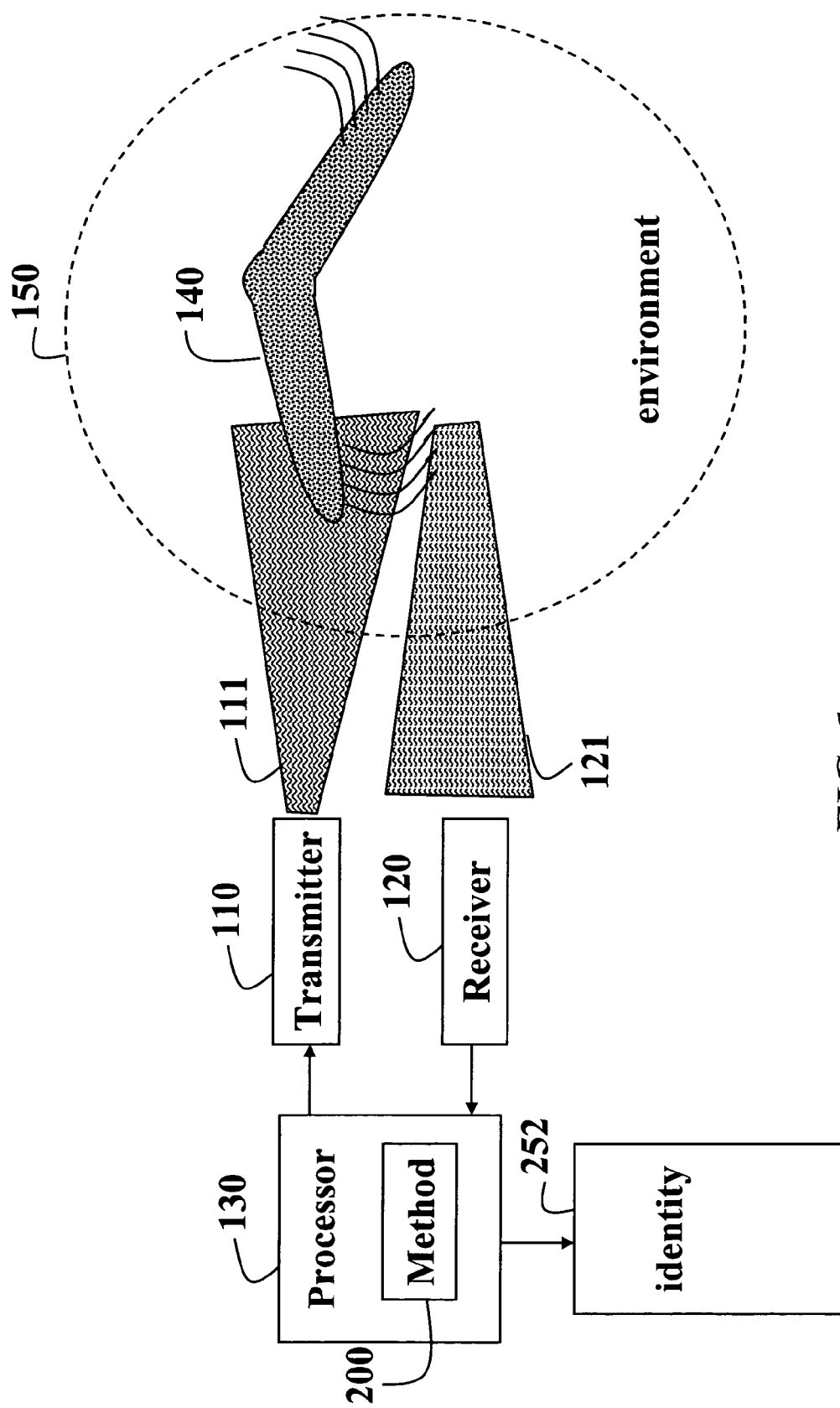
FIG. 1 is a block diagram of an object identification system according to an embodiment of the invention.
Figure 2:
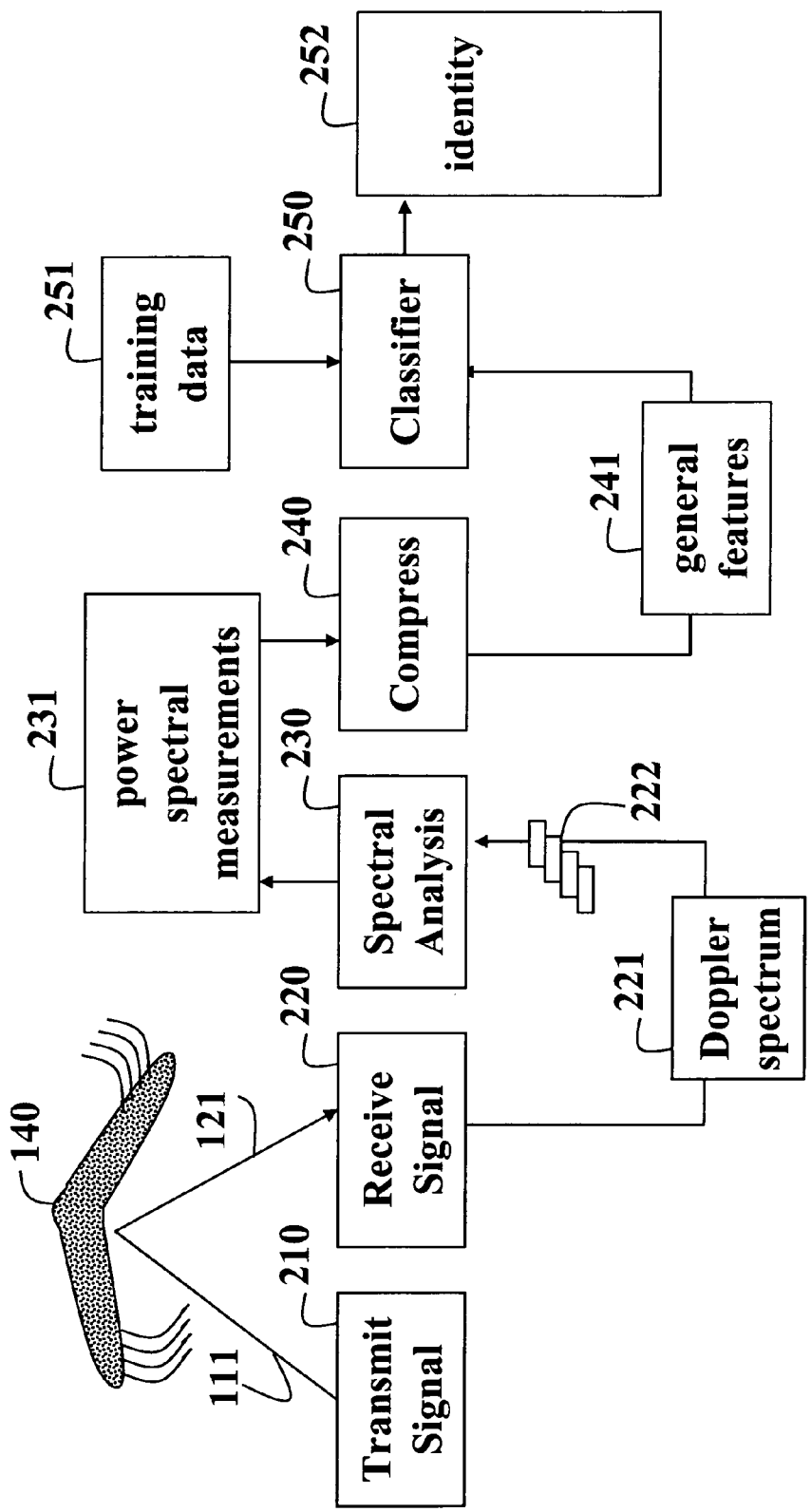
FIG. 2 is a flow diagram of an object identification method according to an embodiment of the invention.

According to one embodiment of the invention, as shown in FIG. 1, a radar system 100 includes a transmitter 110 and a receiver 120 connected to a processor 130. The transmitter and receiver are directed at the same general area in an environment 150. The processor performs a method 200 according to the invention, as shown in FIG. 2.

The transmitter 110 emits 210 a signal 111 supplied by a signal generator. The signal can be electromagnetic or acoustic. A frequency of the signal can be adjusted according to a particular application and a desired resolution. The signal can be in the form of a continuous tone or a pulse train.

The signal 111 is reflected by an unknown object 140 in the environment 150, e.g., a boomerang. The object can be moving, have moving parts or both. The reflected signal 121 is detected 220 by the receiver 120. Because of the movement of the object and the Doppler Effect, a frequency spectrum 221 of the reflected signal 121 can be different than the frequency of the transmitted signal 111. It should be noted that the frequencies in the spectrum of the reflected spectrum can be shifted to a sampling frequency before processing to ensure that all the relevant Doppler information in the received signal is retained. Therefore, the signal to be processed, analyzed, and classified is referred to as the 'Doppler spectrum' 221.

The received signal is sampled and digitized into segments 222. Instead of sampling at the Nyquist frequency, the signal is sub-sampled. For example, if a 40 KHz acoustic signal is used, the sampling rate is 3 KHz. The segments 222 can be about 150 ms long, with a 130 ms overlap between segments.

After segmentation, the spectral analysis 230 receives the segments 222. Power spectral measurements 231 are derived from the segments. The power spectral measurements are compressed 240 by a compressive function, such as a logarithmic or a cube root function to extract general features 241. The features data 241 can be further consolidated by reducing the dimensionality of the measurements. This can be done by linear or non-linear discriminant analysis (LDA) or by a singular value decomposition (SVD), or similar techniques.

Moving averages of the signal features are also maintained. The features of each segment are subtracted from the average to be able to detect changes in states. The moving averages serve to smooth the extracted features 241 over time.

The method also determines a harmonicity of the reflected signal. The harmonicity is another general feature. The harmonicity locates fundamental frequencies and corresponding secondary harmonics. The method also determines ratios of energies at peak and off-peak frequencies.

Where possible, training data 251 are also obtained in an optional preprocessing step for a specific object or for classes of objects, perhaps, in known states and modes of operation or motion.

A classifier 250 takes the general features 241 and optional training data 251 and produces an identity 252 the unknown object 140. The classifier can be a statistical classifier that uses, for example, a neural network, a Gaussian mixture model (GMM), a hidden Markov model (HMM), or a support vector machine (SVM). The method can also determine a state of the object, or changes in state or modes of operation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for identifying a moving object, comprising the steps of:

transmitting, by a transmitter, an acoustic tone at a predetermined frequency;

detecting, by a receiver, a reflected acoustic tone corresponding to the transmitted acoustic tone, the reflected acoustic tone being modulated by an unknown moving object;

extracting acoustic features from the reflected acoustic tone using acoustic spectral analysis;

reducing, in a processor, a dimensionality of the acoustic features; and identifying, in the processor, the unknown moving object using a statistical classifier and the acoustic features by transforming the acoustic tone to an object identity.

2. The method of claim 1, in which the acoustic tone is continuous.

3. The method of claim 1, in which the acoustic tone is pulsed.

4. The method of claim 1, in which the unknown moving object is inanimate.

5. The method of claim 1, in which the unknown moving object is a machine with moving parts.

6. The method of claim 1, further comprising:
sampling, in the processor, the reflected acoustic tone at a rate that is substantially less than the predetermined frequency.

7. The method of claim 1, further comprising:
deriving a power spectrum of the reflected signal; and
compressing the power spectrum according to a cube root function to obtain the features.

8. The method of claim 1, in which the reducing uses discriminant analysis.

9. The method of claim 8, in which the discriminant analysis is non-linear.

10. The method of claim 1, further comprising:
maintaining a moving average of the acoustic features.

11. The method of claim 1, in which the acoustic features include a harmonicity of the reflected acoustic tone.

12. The method of claim 11, in which the harmonicity locates fundamental frequencies and corresponding secondary harmonics.

13. The method of claim 1, in which the statistical classifier uses training data acquired from known objects.

14. The method of claim 1, in which the statistical classifier uses a neural network.

15. The method of claim 1, in which the statistical classifier uses a Gaussian mixture model.

16. The method of claim 1, in which the statistical classifier uses a hidden Markov model.

17. The method of claim 1, in which the statistical classifier uses a support vector machine.

18. The method of claim 1, further comprising:
determining a state of the unknown moving object.

19. The method of claim 1, further comprising:
determining a mode of operation of the unknown moving object.

20. The method of claim 1, in which the unknown moving object is animate.

21. The method of claim 1, wherein the statistical classifier is untrained.

22. The method of claim 1, in which a spectrum of the reflected acoustic tone is Doppler shifted with respect to the transmitted acoustic tone.

23. The method of claim 1, in which the acoustic tone has a frequency of 40 kHz.

24. The method of claim 1, further comprising:
determining ratios of energies at peak and off-peak frequencies of the reflected tone.

25. A method for identifying a moving object, comprising the steps of:
transmitting, by a transmitter, an acoustic tone at a predetermined frequency;
detecting, by a receiver, a reflected signal corresponding to the transmitted signal, the reflected signal being modulated by a unknown object having an unknown motion;
extracting features from the reflected signal using spectral analysis;
identifying, in a processor, the unknown object using a statistical classifier and the features by transforming the acoustic tone to an object identity;
deriving, in the processor, a power spectrum of the reflected signal; and
compressing, in the processor, the power spectrum according to a cube root function to obtain the features.

26. A method for identifying a moving object, comprising the steps of:
transmitting, by a transmitter, an acoustic tone at a predetermined single frequency;
detecting, by a receiver, a reflected acoustic tone corresponding to the transmitted acoustic tone, the reflected acoustic tone being modulated and Doppler shifted by an unknown moving object;
extracting acoustic features from the reflected acoustic tone using acoustic spectral;
reducing, in a processor, a dimensionality of the acoustic features; and
classifying the unknown moving object using a statistical classifier and the acoustic features by transforming the acoustic tone to an object identity.

* * * * *